United States Patent
Kim et al.

(10) Patent No.: US 8,738,095 B2
(45) Date of Patent: May 27, 2014

(54) METHOD FOR OPERATION OF FEMTO BASE STATION BASED ON RADIO ACCESS SYSTEM

(75) Inventors: Eunkyung Kim, Daejeon (KR); Jae Sun Cha, Daejeon (KR); Soojung Jung, Daejeon (KR); JuHee Kim, Daejeon (KR); Kwang Jae Lim, Daejeon (KR); Hyun Lee, Daejeon (KR); Won-Ik Kim, Daejeon (KR); Sung Cheol Chang, Daejeon (KR); Chul Sik Yoon, Seoul (KR); Namgi Kim, Suwon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 127 days.

(21) Appl. No.: 13/381,900

(22) PCT Filed: Jul. 2, 2010

(86) PCT No.: PCT/KR2010/004336
§ 371 (c)(1),
(2), (4) Date: Dec. 30, 2011

(87) PCT Pub. No.: WO2011/002262
PCT Pub. Date: Jan. 6, 2011

(65) Prior Publication Data
US 2012/0108238 A1      May 3, 2012

(30) Foreign Application Priority Data

Jul. 2, 2009 (KR) .................... 10-2009-0060137
Jul. 2, 2010 (KR) .................... 10-2010-0064129

(51) Int. Cl.
*H04M 1/00* (2006.01)

(52) U.S. Cl.
USPC ........ 455/574; 455/444; 455/435.1; 455/561; 370/311; 370/338

(58) Field of Classification Search
USPC ........... 455/443–444, 458, 515, 435.1–435.3, 455/572–574, 561; 370/338, 311, 331
See application file for complete search history.

(56) References Cited

U.S. PATENT DOCUMENTS 7,706,846 B2 * 4/2010 Moon ........................ 455/574
7,778,643 B2 * 8/2010 Laroia et al. ................ 455/448

(Continued)

FOREIGN PATENT DOCUMENTS

KR    2009-0037199 A    4/2009
KR    2009-0045183 A    5/2009

(Continued)

OTHER PUBLICATIONS

Eunkyung Kim et al., "State and Operational Mode of Femtocell BS in IEEE 802.16m", IEEE C802.16m-09/1318, Jul. 6, 2009.

*Primary Examiner* — Sharad Rampuria
(74) *Attorney, Agent, or Firm* — Rabin & Berdo, P.C.

(57) ABSTRACT

A method for opearation of femto base station (BS) is provided. The method includes: transmitting the first low duty operation (LDO) pattern information, which includes length information of an available interval (AI) where the femto BS is activated and length information of an unavailable interval (UAI) where the femto BS is inactivated, to user equipment (UE) and operating based on the first LDO pattern where the first LDO cycle, a sequence of the AI and the UAI, is repeatedly arranged. The first LDO pattern information further including a superframe offset as information for leading a start point of the first LDO cycle.

12 Claims, 8 Drawing Sheets

(56) References Cited

U.S. PATENT DOCUMENTS

| | | | |
|---|---|---|---|
| 8,254,337 B2 * | 8/2012 | Zhong et al. | 370/332 |
| 8,260,270 B2 * | 9/2012 | Yoon et al. | 455/414.1 |
| 8,290,497 B2 * | 10/2012 | Tajima et al. | 455/443 |
| 8,391,860 B2 * | 3/2013 | Jung et al. | 455/434 |
| 8,433,345 B2 * | 4/2013 | Li et al. | 455/458 |
| 8,442,539 B2 * | 5/2013 | Li et al. | 455/444 |
| 8,538,495 B2 * | 9/2013 | Park et al. | 455/574 |
| 8,565,824 B2 * | 10/2013 | Maeder et al. | 455/561 |
| 8,630,213 B2 * | 1/2014 | Lee et al. | 370/300 |
| 2009/0097448 A1 | 4/2009 | Vasudevan et al. | |
| 2010/0309849 A1 * | 12/2010 | Park et al. | 370/328 |
| 2010/0323610 A1 * | 12/2010 | Li et al. | 455/3.01 |
| 2012/0021735 A1 * | 1/2012 | Maeder et al. | 455/422.1 |
| 2012/0157078 A1 * | 6/2012 | Nigam et al. | 455/419 |
| 2012/0157131 A1 * | 6/2012 | Chang et al. | 455/458 |

FOREIGN PATENT DOCUMENTS

| | | |
|---|---|---|
| KR | 2009-0058828 A | 6/2009 |
| WO | WO 2010137831 A2 * | 12/2010 |

* cited by examiner

METHOD FOR OPERATION OF FEMTO BASE STATION BASED ON RADIO ACCESS SYSTEM

TECHNICAL FIELD

The present invention relates to wireless communications, and more particularly, to an operation method for a femto base station.

BACKGROUND ART

In an institute of electrical and electronics engineers (IEEE) 802.16 task group that chooses the next-generation wireless interface standards and a nonprofit worldwide interoperability for microwave access (WiMAX) forum that provides service and network standards for a broadband wireless connection system based on IEEE 802.16, standardization has been being achieved for a wireless connection system supporting a femto-cell to enhance efficiency of the system and improve quality of service (QoS) under an indoor environment. The WiMAX forum defines a femto base station (BS) as a low-power inexpensive base station connected to an Internet protocol (IP) network through a fixed wireless link or a local broadband wired link.

FIG. 1 shows a network structure including a femto-cell system. The femto BS is connected to the IP network spread in a home or an office, and accesses a core network of a mobile communication system through the IP network, thereby providing mobile communication service. That is, the femto BS may be connected to the core network of the mobile communication system through a digital subscriber line (DSL). A user of the mobile communication system may receive the service in the outdoors through the existing macro-cell, but receive the service in the indoors through the femto-cell. The femto-cell improves indoor coverage of the mobile communication system by making up for that the service of the existing macro-cell becomes deteriorated in a building, and provides the service intended for the a specific user, thereby providing voice and data service of high quality. Further, the femto-cell can provide a new service not given in the macro-cell, and the spread of the femto-cell may cause fixed-mobile convergence (FMC) to be accelerated and an industrial-based cost to be reduced.

In a mobile wireless access system supporting the femto-cell, the femto BS has a power off state, an initialization state and an operational state. The power off state refers to a state before the femto BS is powered on or a state that the femto BS is powered off from the initialization state or the operational state. That is, the power off state refers to that no more service is given to user equipment (UE). The initialization state refers to an entry state once the femto BS starts receiving power, in which an initial system parameter acquisition, physical (PHY)/medium access control (MAC) layer parameter decision, topology acquisition or the like wireless interface setting is performed, and time and frequency synchronization using a global positioning system (GPS), a wired interface, IEEE 1588 or the like is performed.

If the femto BS successfully accesses a network, the femto BS enters the operational state. In the case that one or more UEs access coverage of the femto BS and receive service, the femto BS enters a normal operation mode and serves as a BS. Also, the femto BS supports a low duty operation (LDO) mode to decrease interference with neighbor cells. The femto BS, which enters the LDO mode, alternates between an availability interval (AI) and an unavailability interval (UAI). The femto BS entering the AI operates in an active mode. On the other hand, the femto BS entering the UAI does not transmit and receive any information with the UE through an air interface to minimize the interference.

The femto BS of the normal operation mode can enter the LDO mode when all the UE that belong to the femto BS are in a sleep mode or an idle mode or when no UE belongs to the femto BS. The femto BSs, which enter the LDO mode, may be different in the AI and the UAI from one another in accordance with conditions of the BS. That is, the femto BSs in the LDO mode may have different patterns of the AI and the UAI according to the BSs.

The above related arts refer to an entry condition of the femto BS from the operational state into the normal operation mode and the LDO mode and an operation method for the LDO mode. However, since the above related art is nothing but mention about general technology, there are further needed detailed descriptions about a switching condition of the operation state to be considered in the practical femto BS, a determining method for an LDO cycle as a basis of the operation of the LDO mode, etc.

SUMMARY OF INVENTION

Technical Problem

The present invention provides an operation method for a femto base station, which sets a low duty operation (LDO) cycle as a basis of an LDO mode and sets the LDO cycle variably depending on communication environments, in a mobile wireless access system supporting a femto-cell.

Technical Solution

In an aspect of the invention, there is provided a method for operation of femto base station(BS). The method includes transmitting the first low duty operation (LDO) pattern information, which includes length information of an available interval (AI) where the femto BS is activated and length information of an unavailable interval (UAI) where the femto BS is inactivated, to user equipment (UE); and operating based on the first LDO pattern where the first LDO cycle, a sequence of the AI and the UAI, is repeatedly arranged. The first LDO pattern information further including a superframe offset as information for leading a start point of the first LDO cycle.

The first LDO pattern information may be transmitted as being included in a register response message corresponding to a network register request message of the UE.

Length of the AI and length of the UAI may be at least one superframe. The start of the first LDO cycle may be obtained by the following modulo calculation:

$$N \bmod (a+b) = \text{SFO}$$

where, N is a superframe number indicating the start point of the first LDO cycle, a is the length of the AI, b is the length of the UAI, and SFO is the superframe offset.

The method of claim may further include, receiving a signal with information of the UE from the UE; setting the second LDO cycle changed from the first LDO cycle variably on the basis of at least one of the information of the UE and system information of the femto BS; and transmitting information of the second LDO pattern including the second LDO cycle to the UE. The femto BS may operates on basis of the the second LDO pattern.

The method may further include switching the femto BS from the LDO mode to a normal operation mode if receiving a request signal from a macro BS, a core network or the UE.

The request signal may include an access request signal to the femto BS from a UE that is not accessing the femto BS.

The request signal may include a handover request signal of one or more UEs that are accessing a neighbor femto BS.

The request signal may include a signal for making one or more UEs in idle mode exit from idle mode.

The request signal may includee a signal for terminating sleep mode of one or more UEs in sleep mode.

The request signal may include a signal for changing a carrier frequency of the femto BS.

Advantageous Effects

According to an exemplary embodiment of the present invention, it is possible to more efficiently and correctly manage a femto base station in a mobile wireless access system that supports a femto-cell. In particular, a low duty operation (LDO) cycle is variably determined in an LDO mode, so that the mobile wireless access system can be operated simply and efficiently while flexibly reflecting a situation of a femto-cell system.

MODE FOR INVENTION

Below, exemplary embodiments of the present invention will be described in detail with reference to accompanying drawings.

Figure 1:
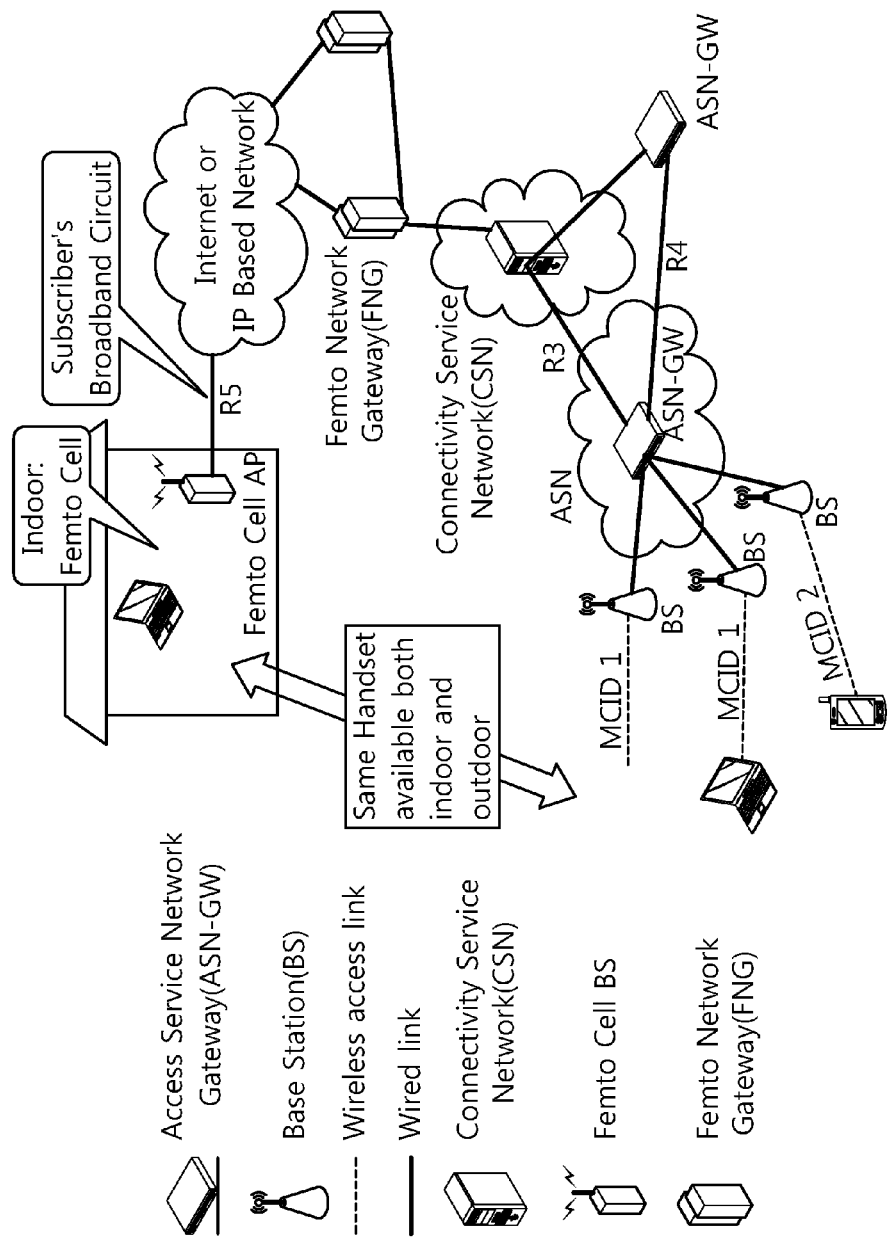
FIG. 1 shows a network structure including a femto-cell system.
Figure 2:
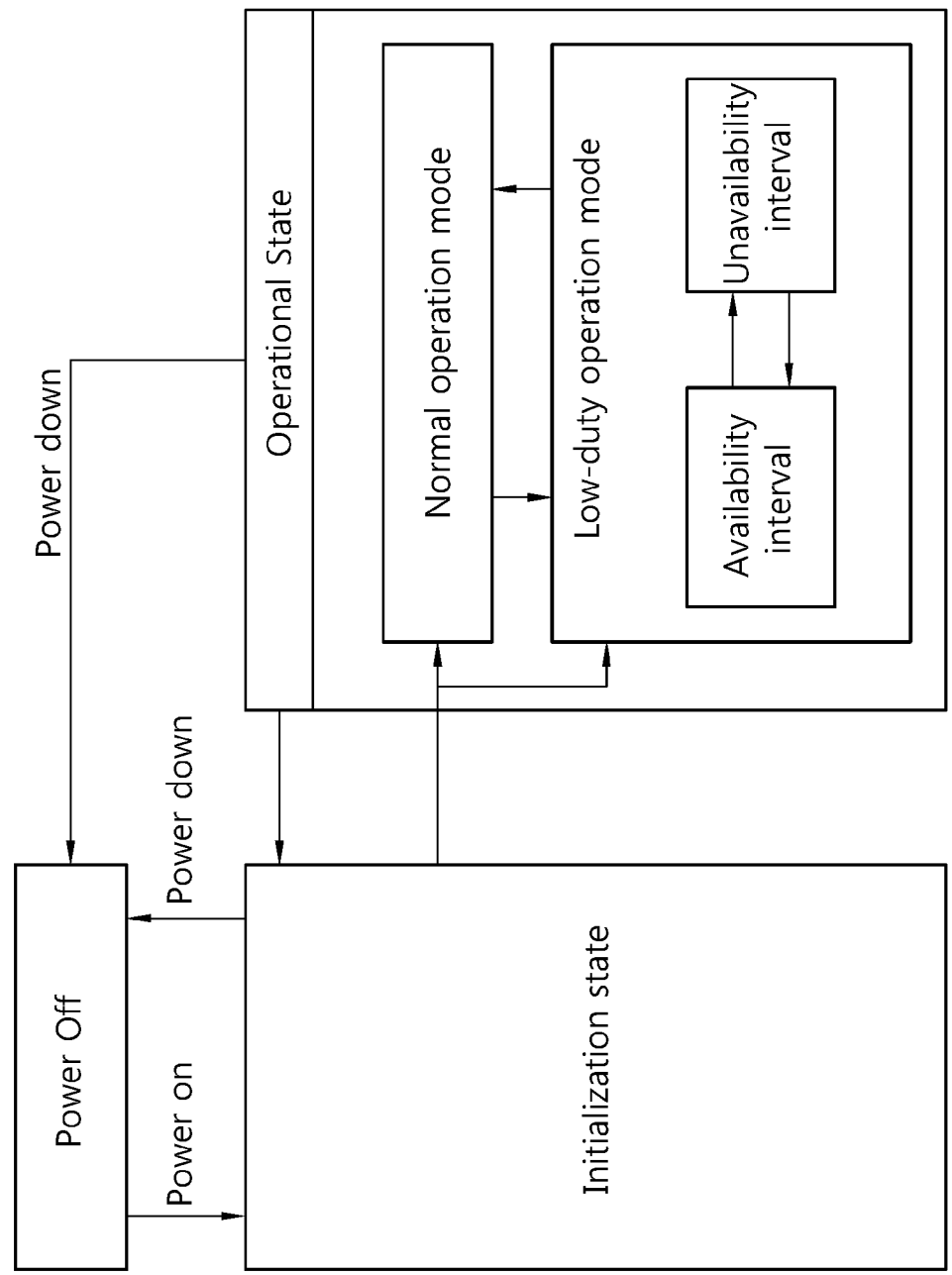
FIG. 2 shows an operation state and a state switch of a femto base station (BS)

FIG. 2 shows an operation state and a state switch of a femto base station (BS).

Referring to FIG. 2, the femto BS operates in three major states such as a power off state, an initialization state, and an operational state. The femto BS in the operational state is switched into the initialization state and performs synchronization when it is out of sync with a macro BS or another femto BS having a femto-cell connected to the macro BS. Also, the femto BS may stop wirelessly transmitting and receiving data with user equipment (UE) when disconnected from a backhaul, and requests the UE, which receives service before out-of-service, to perform a handover (HO) to a neighboring macro-cell or femto-cell. The femto BS disconnected from the backhaul tries to reconnect and performs synchronization again when connected, thereby entering an operation mode.

In this case, if there is no UE receiving service within coverage of the femto BS, if the UE within the coverage of the femto BS is in an idle mode or a sleep mode, or if necessary, the femto BS may enter a low duty operation (LDO) mode. If unscheduled or scheduled power-off occurs in the operational state, the femto BS informs the UE of the out-of-service and performs the power-off. At this time, the femto BS may request the UE to perform the HO to the macro-cell or the femto-cell like the above description. At this time, information about the out-of-service to be given to the UE may include reason of the out-of-service, an expected uptime/downtime, etc. This is to prevent the UE from a network entry or reentry into the femto BS to be powered off.

If one or more UEs receive service within the coverage of the femto BS, the femto BS maintains a normal operation mode. The femto BS in the normal operation mode periodically synchronizes with an overlay macro BS through a global positioning system (GPS), a wired interface, IEEE 1588, etc. and notifies a system status such as a frequency assignment or the like of the femto-cell within the coverage of the femto BS.

If there is no UE receiving service within coverage of the femto BS, or if the UE within the coverage of the femto BS is in the idle mode or the sleep mode, the femto BS is switched into the LDO mode. The femto BS in the LDO mode alternates between an availability interval (AI) where it operates in an active mode and an unavailability interval (UAI) where it operates in an inactive mode not to wirelessly transmit and receive any information with the UE for so as to minimize interference. Such sequence of the AI and the UAI is called an LDO cycle, and the femto BS operates by an LDO pattern where the LDO cycle is repeatedly arranged. During the AI, the femto BS is activated on an air interface for operation such as synchronization, paging, system information transmission, ranging, etc. or data traffic transmission. During the UAI, the femto BS does not perform any wireless transmission and performs synchronization with the overlay macro BS or measuring interference with a neighbor cell.

Figure 3:
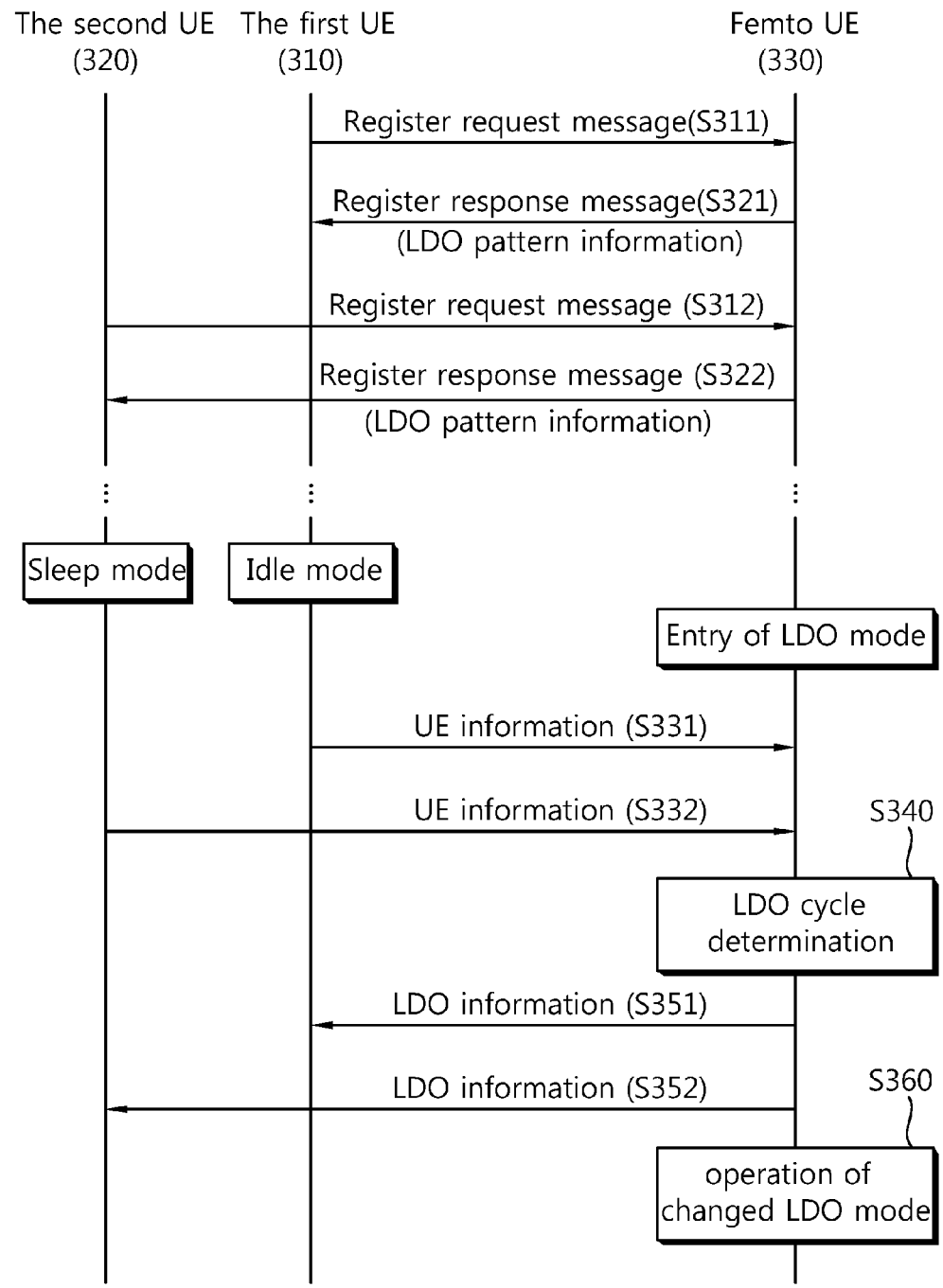
FIG. 3 is a flowchart showing operation of the femto BS in the LDO mode according to an exemplary embodiment of the present invention.

FIG. 3 is a flowchart showing operation of the femto BS in the LDO mode according to an exemplary embodiment of the present invention.

The first UE 310 and the second UE 320 transmit register request messages AAI_REG-REQ to the femto BS 330, respectively (S311, S312). The femto BS transmits register response messages AAI_REG-RSP to the first UE 310 and the second UE 320 in response to the received register request messages, respectively (S321, S322). The register response message transmitted by the femto BS 330 contains information about the LDO pattern as a basis of the LDO operation of the femto BS 330. In FIG. 3, the information about the LDO pattern is transmitted as being contained in the message, but not limited thereto. Alternatively, the information about the LDO pattern may be previously stored in the UE.

The information about the LDO pattern may includes a Start of LDO, which notifies a start point of the LDO, an AI length and an UAI length. Here, the Start of LDO may be a superframe offset. In this case, each of the AI length and the UAI length may be a unit of the superframe. The start point of one LDO cycle constituting the LDO pattern is an Nth superframe that satisfies 'N modulo (AI+UAI)=superframe offset.' In one LDO cycle, the AI and the UAI are arranged with respect to a certain Nth superframe that satisfies the above expression, and the length of the LDO cycle is the sum of the AI length and the UAI length. There may be at least one Nth superframe, i.e., the start point of the LDO cycle that satisfies the foregoing modular calculation. Thus, at least one LDO cycle is successively and repetitively formed, thereby forming an LDO pattern.

Then, the UEs 310, 320 registered to the femto BS 330 are all operated in the idle mode or the sleep mode, the femto BS enters the LDO mode. At this time, the LDO pattern becomes active and the femto BS 330 operates in accordance with the LDO pattern. However, if the UEs 310, 320 are connected to the femto BS 330, the existing LDO pattern has to be modified. In other words, there is a need of determining a changed LDO cycle by variably setting the LDO cycle, the sequence of the AI and the UAI, while reflecting information of the connected UE and/or system information of the femto-cell, etc, to the LDO pattern as the basis of the LDO mode operation of the femto BS 330.

The femto BS 330 receives information about the UE 310 that enters the idle mode (S331), and receives information about the UE 320 that enters the sleep mode (S332), thereby determining the changed LDO cycle on the basis of the BS's own information about the femto-cell system information and UE information acquired through a receiving process (S340). After determining the changed LDO cycle, the femto BS 330 transmits LDO relevant information that contains the determined changed LDO cycle to the respective UEs 310, 320 (S351, S352), and operates in the changed LDO mode based on the changed LDO pattern (S360).

The LDO relevant information (S351, 5352) transmitted from the femto BS 330 may include information about LDO indication parameter for indicating an operation state of the BS, an action time for an LDO initiation parameter for indicating an action time of the LDO mode, a frequency assignment (FA) of the femto BS, a changed LDO pattern, etc. The LDO relevant information may be system information that the femto BS 330 broadcasts. Also, the changed LDO relevant information may be transmitted as being included in the register response message AAI_REG-RSP transmitted by the femto BS 330 to the UE in response to the register request message of the UE.

The LDO indication parameter indicates information about whether the femto BS operates in the normal operation mode or the LDO mode. The LDO indication parameter is provided in a location predefined by the system between the femto BS and the UE and periodically transmitted. The UE within the coverage can be informed through a superframe header (SFH), and the UE within a neighbor cell can be informed by a neighbor cell BS through a neighbor BS list or informed through an HO signaling message when being handed over from the neighbor cell to the current femto-cell.

The action time for the LDO initiation parameter indicates a point of time when the femto BS initiates operation in the LDO mode. In this case, the neighbor BS may notify the neighbor cell list of the operation mode of the femto BS with regard to the state and the action time of a changed mode. Also, when the LDO cycle pattern is changed, it is possible to notify the initiation time. That is, after the action time is ended, a new LDO pattern is applied. At this time, the neighbor cell is informed of the changed point of time, so that the neighbor cell can ascertain a point of time to apply the changed LDO pattern. In accordance with a newly initiated LDO or a changed LDO, the time to start the HO can be determined in sync with the AI. The UE within the femto-cell coverage depends on the newly changed LDO pattern. The UE on the idle mode can perform paging in sync with the AI, and the UE on the sleep mode can do an uplink operation performable in a listening window in sync with the AI and determine a point of time to apply a change of a sleep mode parameter in sync with the action time. If the UE is informed of many LDO patterns and stores them, the UE can consult the LDO cycle corresponding to a pattern number when the femto-cell BS notifies the UE of only information about the pattern number assigned to each LDO pattern. This may be applied to another neighbor cell. The point of time to apply the pattern is informed through the action time.

The femto-cell FA is given to the UE that wants to make an entry or a reentry, i.e., the HO, into the current femto BS, so that the UE can do frequency synchronization and be registered.

The information about the changed LDO pattern may include information about a start of the LDO, which notifies a start point of a new LDO mode, a changed LDO cycle length or a changed AI length, and may further discretionarily include information about a UAI length. The AI and UAI lengths are changeable and may be thus different from those of the existing LDO cycle. The LDO cycle length is an interval of AI+UAI, which may be informed as a unit of the superframe. At this time, the sleep mode UE may be informed of an exponential power of '2' to be efficiently applied with a change of a sleep window. Also, the AI length can be informed as a unit of the superframe, and the sleep mode UE may be informed of the exponential power of '2' to be efficiently applied with the change of the sleep window. If the UAI length is not initially set, the start of the UAI and the UAI length can be obtained by considering two equations, the start of the UAI=the start of the LDO+the AI length and the UAI length=the LDO cycle length–the AI length. If the changed LDO pattern has a sequence similar to the existing LDO pattern, it is possible to use the same method of transmitting information related to the existing LDO pattern.

FIGS. 4 to 7 are view for explaining the changed LDO cycle in more detail. Below, the changed LDO cycle and the changed LDO pattern in the exemplary embodiment of FIG. 3 will be called an LDO cycle and an LDO pattern, respectively.

Figure 4:
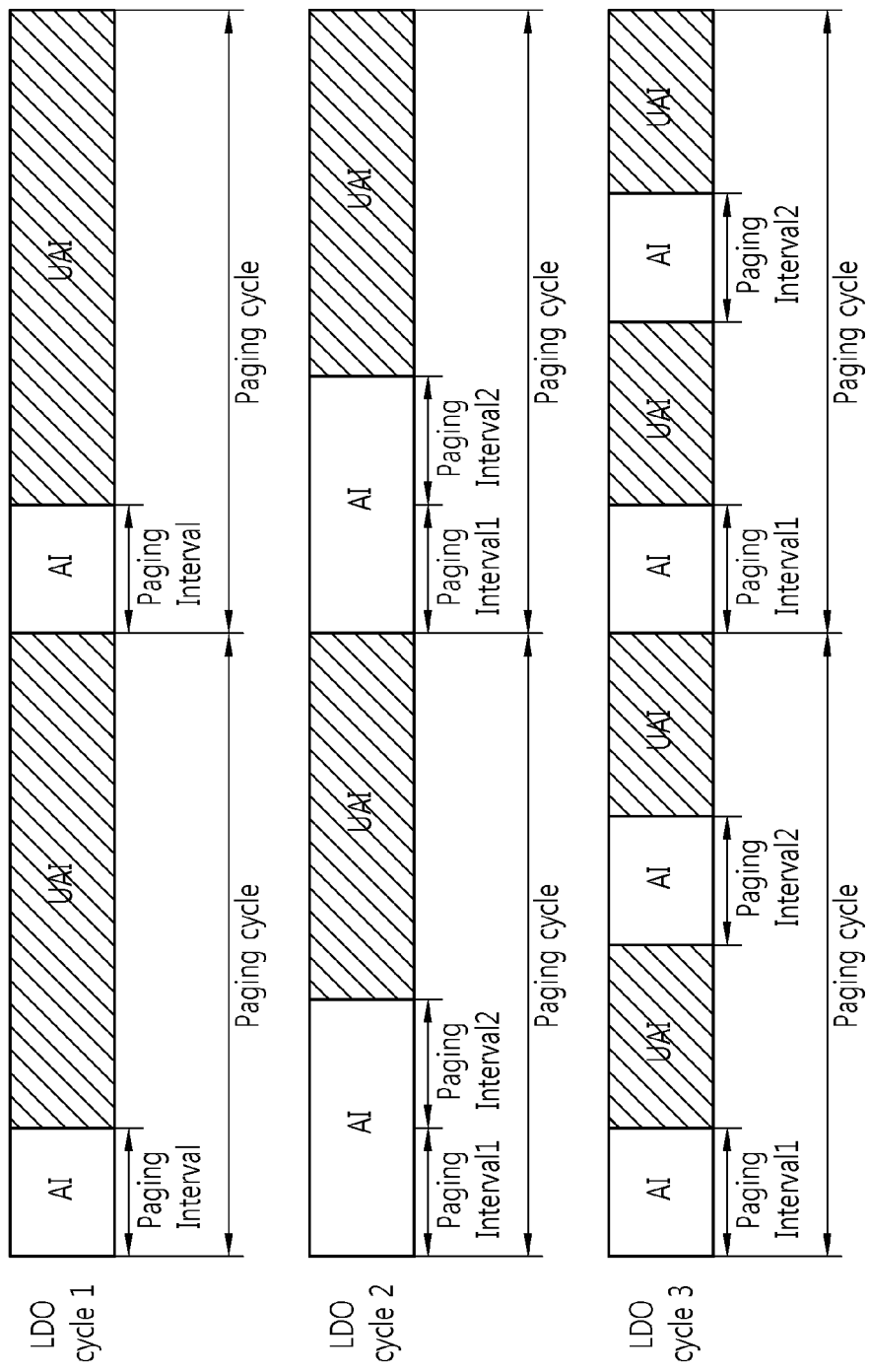
FIG. 4 shows a structure of an LDO cycle determined on the basis of a paging cycle according to an exemplary embodiment of the present invention.

FIG. 4 shows a structure of an LDO cycle determined on the basis of a paging cycle according to an exemplary embodiment of the present invention.

Referring to FIG. 4, the LDO cycle in this exemplary embodiment may be set on the basis of the paging cycle of the UE that is connected to the femto BS operating in the LDO mode and operates in the idle mode. In other words, the AI may be determined depending on a paging interval of the paging cycle. The LDO cycle 1 on the top in FIG. 4 shows an LDO cycle structure when one paging group has one paging offset. The LDO cycles 2 and 3 show LDO cycle structures when one or more paging groups have many paging offsets. Thus, the AI is determined in consideration of all paging intervals when the LDO cycle is determined on the basis of the paging cycle.

Figure 5:
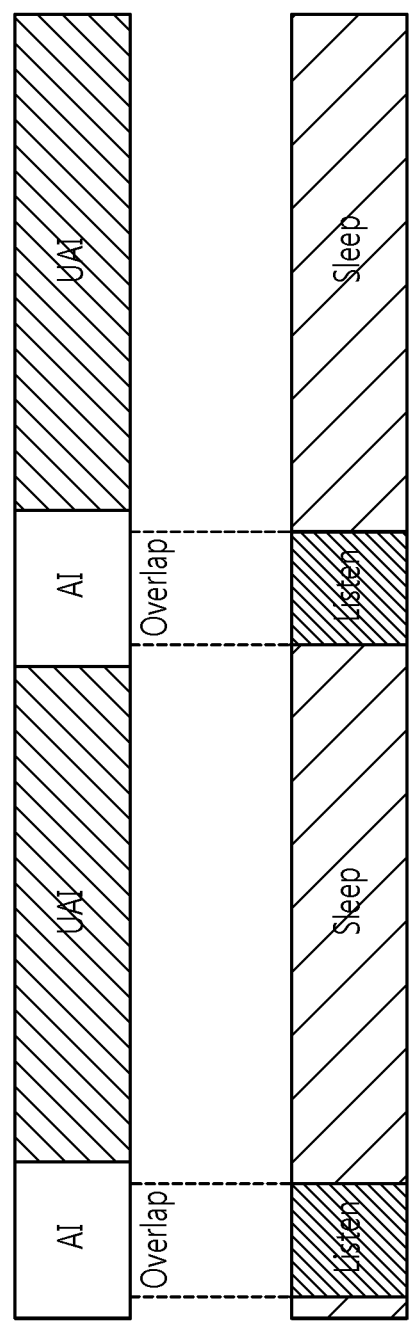
FIG. 5 shows a structure of an LDO cycle determined on the basis of a listening window according to an exemplary embodiment of the present invention.

FIG. 5 shows a structure of an LDO cycle determined on the basis of a listening window according to an exemplary embodiment of the present invention.

Referring to FIG. 5, the AI of the LDO cycle is overlapped with a listening window of the UE operating in the sleep mode. The UE operating in the sleep mode, it receives opportunity for uplink transmission from the BS within the listening window interval, in which the UE cannot perform the uplink transmission even though the UAI interval is the listening window interval if the BS operates in the LDO mode. Therefore, the LDO cycle has to be set so that the listening window of the UE overlaps with the AI.

If the listening window does not overlap with the AI, the LDO cycle has to be newly determined or the BS operating in the LDO mode has to be switched into the normal operation mode. Thus, the UE may transmit a signal such as a code division multiple access (CDMA) ranging code to the BS in order to be switched into the normal operation mode. To support this, the BS opens and monitors a minimum uplink control channel to receive a signal from the UE even in the UAI.

Figure 6:
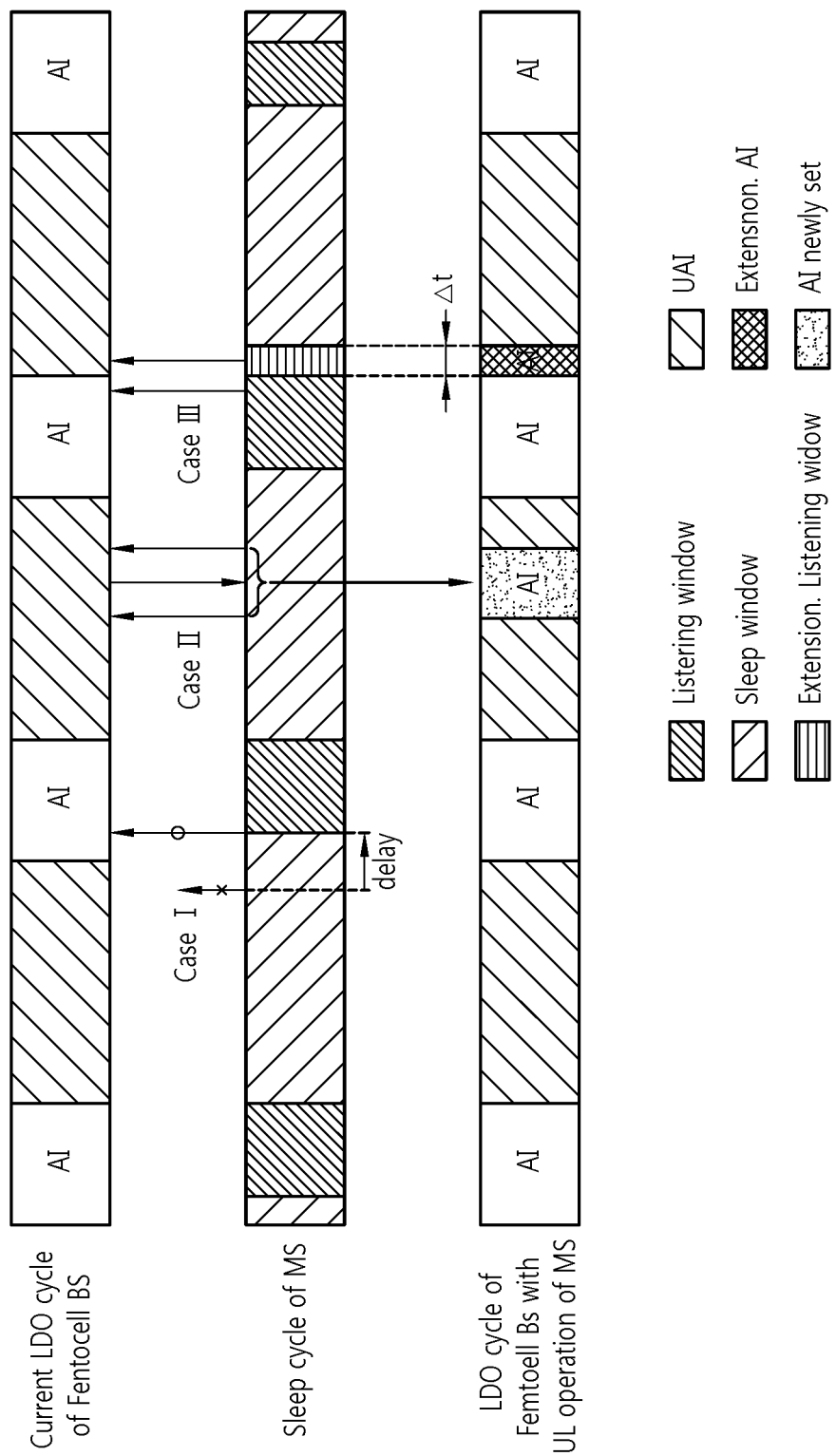
FIG. 6 shows variable operation based on the LDO cycle according to an exemplary embodiment of the present invention.

If the UEs of both the idle mode and the sleep mode exist in the femto BS, the LDO cycle has to be determined in consideration of both the paging cycle and the listening window. FIG. 6 shows variable operation based on the LDO cycle according to an exemplary embodiment of the present invention.

Referring to FIG. 6, the UE may perform uplink operation in sync with the AI if the uplink operation is enabled. On the other hand, if the uplink operation is disabled, that is, as shown in FIG. 6, there is required a series of processes for enabling the uplink operation when the UE performs the uplink operation during the UAI. Case 1 shows that the uplink operation is delayed and performed. In the case where the UE makes request in the UAI ($t_1$), the BS delays the uplink operation until the next AI ($t_2$) and then performs it. Case 2 shows that the LDO cycle is reset to temporarily switch the UAI into the AI. To temporarily switch the UAI into the AI, the UE may transmit the CDMA ranging code or the like signal to the BS. Thus, the BS may open and monitor the minimum uplink control channel to receive a signal of MS in the UAI. Case 3 shows that the AI is temporarily extended in the case that the uplink operation is impossible in the listening window and thus the listening window has to be extended. Since the UE performs the uplink operation in the listening window but extends the listening window as much as $\Delta_t$ to further perform the uplink operation, the UAI is temporarily switched into the AI as much as $\Delta_t$ in the LDO cycle for supporting this, thereby having an extension effect on the AI.

Figure 7:
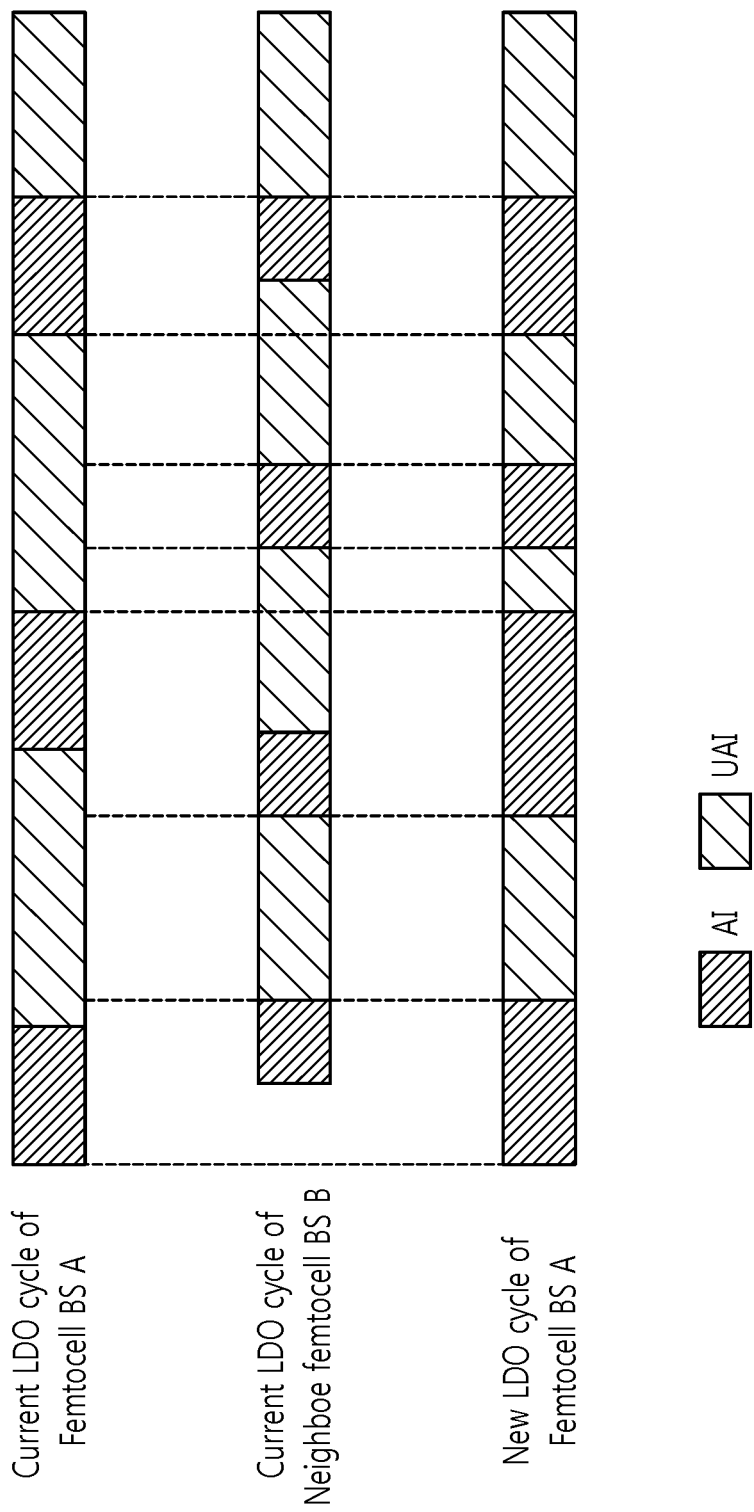
FIG. 7 shows a structure of an LDO cycle variably set in consideration of an LDO cycle of a neighboring BS according to an exemplary embodiment of the present invention.

FIG. 7 shows a structure of an LDO cycle variably set in consideration of an LDO cycle of a neighbor BS according to an exemplary embodiment of the present invention.

Referring to FIG. 7, in the case that a neighbor femto BS operates in the LDO mode, the current LDO cycle may be determined on the basis of the LDO cycle of the neighbor femto BS. In the case that the neighbor femto BS B operates in the LDO mode, if the current LDO cycle is changed on the basis of the neighbor LDO cycle, it is possible to give continuous service to the UE that is handed over from the neighbor femto BS B to the original femto BS A. FIG. 7 shows that the AI including both the AI of the LDO cycle of the femto BS B and the AI of the LDO cycle of the femto BS A is regarded as a new AI to determine the LDO cycle, but not limited thereto. Alternatively, only the overlapped AI may be regarded as a new AI to determine the LDO cycle. Also, only the LDO cycle of the original femto BS may be newly determined, and the LDO cycle of the original femto BS and the LDO cycle of the neighboring femto BS may be switched into a new LDO cycle.

Figure 8:
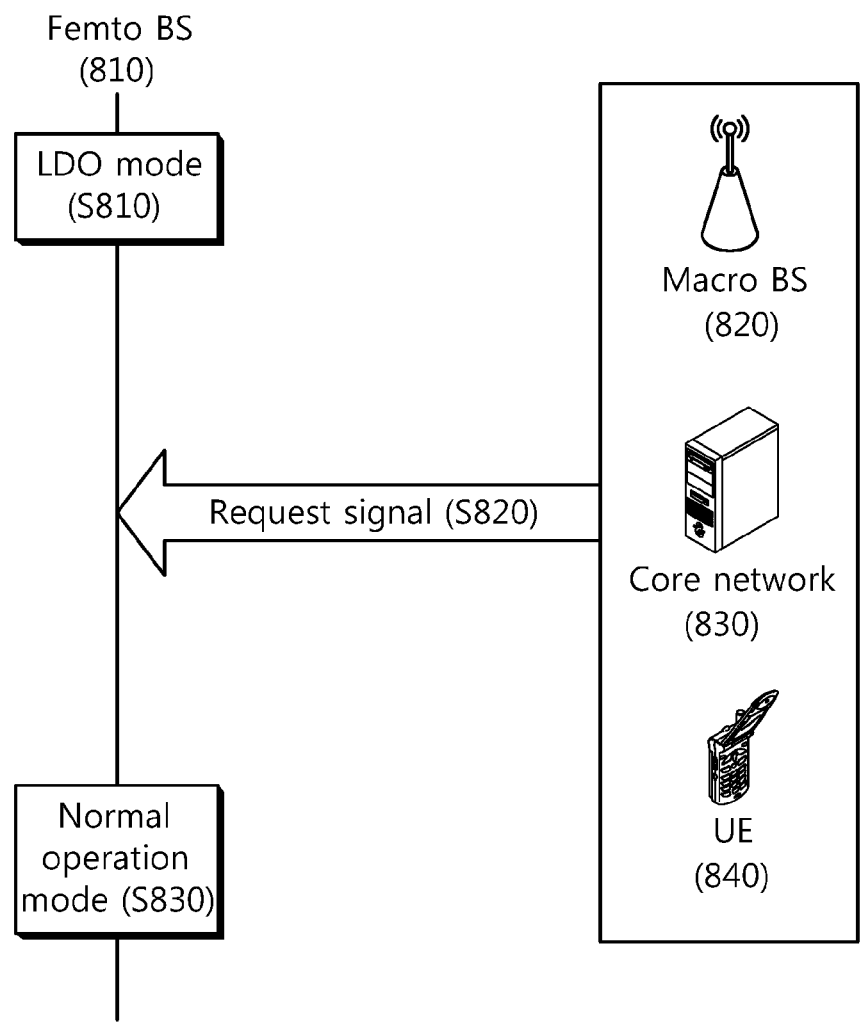
FIG. 8 is a flowchart showing operation mode switch of the femto base station according to an exemplary embodiment of the present invention.

FIG. 8 is a flowchart showing operation mode switch of the femto base station according to an exemplary embodiment of the present invention.

Referring to FIG. 8, a femto BS 810 enters the normal operation mode by switching the operation mode (S830) if receiving a request signal from the macro BS 820, the core network 830 and the UE 840 (S820) in the state that the femto BS 810 operates in the LDO mode (S810). The request signal transmitted from the UE 840 to the femto BS 810 corresponds to an uplink signal, so that the femto BS 810 can continuously monitor the uplink signal while operating in an uplink LDO mode like the operation in the normal operation mode. The request signal may include a message for a network entry of the UE 840 within the coverage of the femto BS 810, a message for handover, a message of making the UE exit from the sleep mode, a message of terminating the idle mode of the UE, a request for terminating the LDO mode through a signal such as a CDMA ranging code if the UE 840 in the femto cell has to terminate the LDO mode due to various reasons, etc. Besides the request signal, it is possible to switch into the normal operation mode when there are reasons for terminating the LDO mode on the femto-cell system, for example, when the femto BS 810 is changing the carrier frequency, when the UE incapable of the uplink operation wants to perform the uplink operation in a sleep interval (on the other hand, the UE capable of the uplink operation can perform the uplink operation while keeping the LDO mode), when it is impossible to determine the LDO cycle because there is no interval where the listening window is overlapped with respect to the plurality of UEs being in the sleep mode state, there is no interval where the paging interval is overlapped with respect to the plurality of UEs being in the idle mode, or etc.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An operation method of a femto base station (BS), the method comprising:
   transmitting information of a first low duty operation (LDO) pattern to user equipment (UE), the first LDO pattern including repeatedly arranged first LDO cycles, each first LDO cycle including a sequence of an available interval (AI) where the femto BS is activated and an unavailable interval (UAI) where the femto BS is inactivated, the first LDO pattern information including a length of the AI, a length of the UAI and a superframe offset (SFO); and
   operating the femto BS based on the first LDO pattern, wherein,
   a start of each first LDO cycle is obtained by the following modulo calculation:

$N \bmod (a+b) = \text{SFO}$ where, N is a superframe number indicating the start of said each first LDO cycle, a is the length of the AI, and b is the length of the UAI.

2. The method of claim 1, wherein the first LDO pattern information is included in a register response message corresponding to a network register request message of the UE.

3. The method of claim 1, wherein the length of the AI and the length of the UAI are both at least one superframe.

4. The method of claim 1, further comprising:
   receiving a signal including information of the UE from the UE;
   setting a second LDO cycle changed from the first LDO cycle variably on the basis of at least one of the information of the UE and system information of the femto BS; and
   transmitting information of a second LDO pattern including the second LDO cycle to the UE,
   wherein the femto BS operates on the basis of the second LDO pattern.

5. The method of claim 1, further comprising switching the femto BS from a LDO mode to a normal operation mode upon receipt of a request signal from a macro BS, a core network or the UE.

6. The method of claim 5, wherein the request signal includes an access request signal to the femto BS from a UE that is not accessing the femto BS.

7. The method of claim 5, wherein the request signal includes a handover request signal of one or more UEs that are accessing a neighbor femto BS.

8. The method of claim 5, wherein the request signal includes a signal for making one or more UEs in an idle mode exit from the idle mode.

9. The method of claim 5, wherein the request signal includes a signal for terminating a sleep mode of one or more UEs in the sleep mode.

10. The method of claim 5, wherein the request signal includes a signal for changing a carrier frequency of the femto BS.

11. An operation method of a user equipment (UE), the method comprising:

receiving information of a low duty operation (LDO) pattern from a femto base station (BS), the first LDO pattern including repeatedly arranged first LDO cycles, each first LDO cycle including a sequence of an available interval (AI) where a femto base station (BS) is activated and an unavailable interval (UAI) where the femto BS is inactivated, the first LDO pattern information including a length of the AI, a length of the UAI and a superframe offset (SFO); and operating the UE based on the LDO pattern, wherein a start of each first LDO cycle is obtained by the following modulo calculation:

$$N \bmod (a+b) = SFO$$

where, N is a superframe number indicating the start of said each first LDO cycle, a is the length of the AI, and b is the length of the UAI.

12. The method of claim 11, wherein the length of the AI and the length of the UAI are both at least one superframe.

* * * * *